(No Model.) 2 Sheets—Sheet 1.
H. R. MATHEWS.
PICKER CHECK FOR LOOMS.
No. 530,438. Patented Dec. 4, 1894.
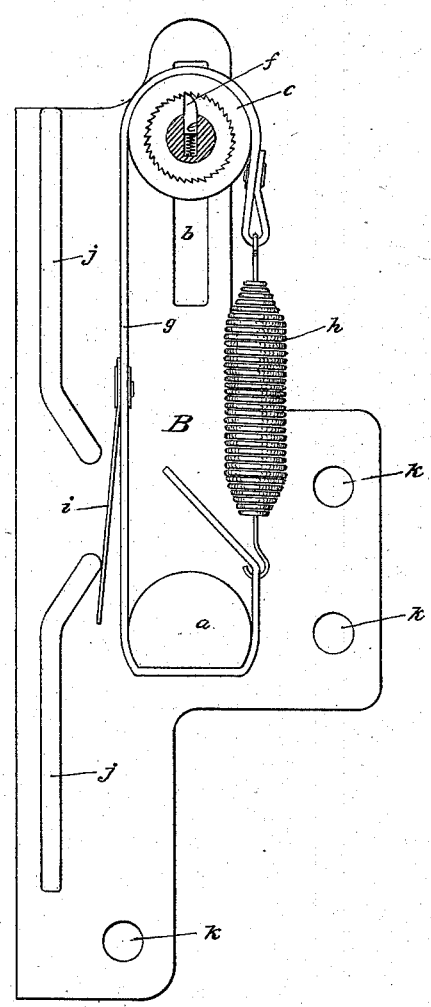
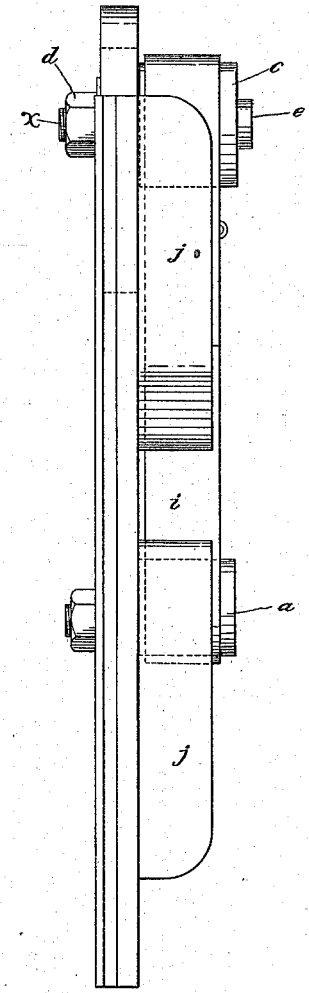
WITNESSES:
INVENTOR
BY
ATTORNEY (No Model.) 2 Sheets—Sheet 2.

H. R. MATHEWS.
PICKER CHECK FOR LOOMS.

No. 530,438. Patented Dec. 4, 1894.

WITNESSES:

INVENTOR

ATTORNEY

UNITED STATES PATENT OFFICE.

HENRY R. MATHEWS, OF TRENTON, NEW JERSEY, ASSIGNOR OF ONE-HALF TO HENRY J. BAILEY, OF GREENEVILLE, RHODE ISLAND.

PICKER-CHECK FOR LOOMS.

SPECIFICATION forming part of Letters Patent No. 530,438, dated December 4, 1894.

Application filed February 3, 1893. Serial No. 460,836. (No model.)

*To all whom it may concern:*

Be it known that I, HENRY R. MATHEWS, a citizen of the United States, residing at Trenton, in the county of Mercer and State of New Jersey, have invented certain new and useful Improvements in Picker-Checks for Looms; and I do declare the following to be a full, clear, and exact description of my invention, such as will enable others skilled in the art to which it appertains to make and use the same.

My invention relates to an improved mechanism for stopping the flight of the shuttle as it is thrown from side to side in the ordinary looms for weaving textile fabrics; and the object of my invention is to provide a yielding buffer which yields slightly but quickly to the impact of the picker under the blow of the shuttle and which returns more slowly to its normal position, thus in large measure obviating the rebound of the shuttle as hereinafter specified and claimed.

Figure 3:
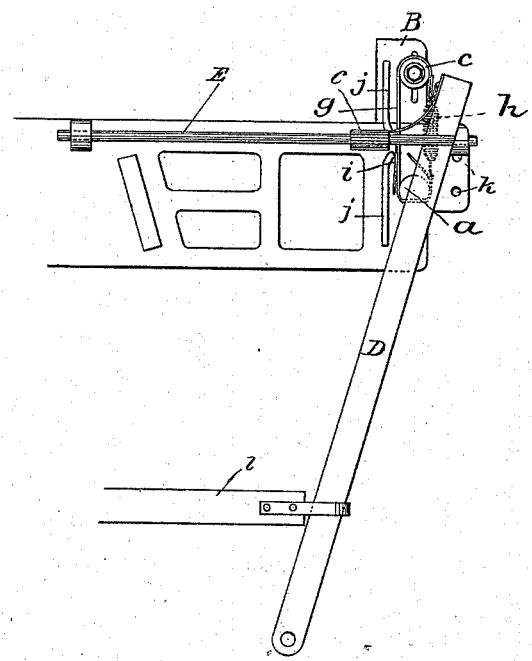
Figure 4:
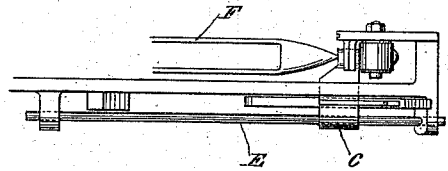

In the accompanying drawings illustrative of my invention and in which I have shown my shuttle check attached to the shuttle box-guide of an ordinary loom, Figure 1 shows a side view of a shuttle check embodying my invention. Fig. 2 represents a front view of the same. Fig. 3 represents a rear view of a portion of the shuttle box-frame of a loom with my shuttle-check attached; and Fig. 4 is a top view of the same showing a portion of a shuttle and the picker in contact with the shuttle-check.

In the drawings A represents the shuttle box-frame to which is attached the shuttle box. Not shown in the drawings.

B is the shuttle box-guide upon which the shuttle checking mechanism is fixed.

C represents the picker.

D is the picker-stick.

E is the picker guide or spindle, and F is a shuttle.

The plate B is made of cast iron or steel, and is provided with a supporting lug $a$ which may be bolted to the plate as shown in Fig. 2, or it may be cast integral therewith. The upper portion of the plate B is provided with a slot $b$ in which is adjusted a spindle $x$ which carries the supporting roller $c$. The spindle is threaded at one end to receive the nut $d$ by which it is adjusted and held at any point within the slot $b$. At the opposite end of the spindle is the hub $e$ in which plays the dog $f$ which is seated upon a small spiral spring within the hub which tends to enforce contact between the dog and the teeth of the internal ratchet formed upon the face of the roller $c$, as shown in Fig. 1. Over the lug $a$ and roller $c$ is passed a leather strap or band $g$ the ends of which are preferably united by the spiral spring $h$. To the outer face of the band or strap $g$ is preferably attached a shield of leather or other suitable substance $i$. Upon the face of the plate B are cast the flanges $j, j$. These flanges serve to slide the shuttle back into a rising and falling shuttle box, so that the vertical motion of the box may not be interfered with. The plate B is provided with openings $k, k, k$, by means of which it is attached firmly to the shuttle box frame A by bolts.

When the checking mechanism is in place upon the loom the shield $i$ is brought directly in line with the line of motion of the operating shuttle and of the picker C. As will be readily understood, the shuttle is projected outward from its position at the end of the shuttle box frame by the action of the picker C and the picker stick D which latter derives its motion through the rod $l$. When the shuttle is returned by the throw of the picker and picker stick at the opposite end of the shuttle box frame it strikes the head of the picker C, as shown in Fig. 4, and drives the picker between the adjacent ends of the flanges $j, j$ and against the shield $i$. The impact of the shuttle and picker with the shield $i$ is, of course, instantly communicated to the band $g$ and deflects it from a right line inwardly toward the spiral spring $h$. The draft thus produced upon the band $g$ slightly turns the roller $c$, and acts upon the spiral spring $h$ to extend it, and at the same time the slight rotation given to the roller $c$ causes the dog $f$ to take into the next tooth of the ratchet on the roller $c$, and, as the roller can not turn in the reverse direction, the motion of the band $g$, which is drawn into a straight line by the resiliency of the spring $h$, is somewhat retarded by the friction of the band upon the surface of the roller $c$, thus decreasing the rebound of the picker and the shuttle so that the shuttle remains in position close to the picker, and receives the full force of the next throw of the picker stick D. By thus reducing the rebound of the shuttle I am enabled to materially loosen the binding springs of the shuttle box which grasp the shuttle, and so require less power to drive the shuttle, as will be readily understood. The use of the device above described also prevents kinking of the thread in the cloth due to the slack in the thread caused by the rebound of the shuttle, which rebound occurs when the shuttle is not properly checked in its flight.

I am aware that an impact band has been used as a shuttle check; but such band has been passed over posts or lugs simply, and, owing to friction, has not yielded so readily to the impact of the shuttle as does mine, while the apparatus contains no appliance for reducing the rebound of the shuttle. I do not, therefore, broadly claim a shuttle check; yet I do not limit my claims to a buffer consisting of an impact band, such as is illustrated in the drawings, nor to the specific form of retarding device shown herein, as I believe myself to be the first to produce a combination of yielding buffer, restoring device, and a device for retarding the action of the restoring device.

Various modifications of the elements of this general combination may be made without departing from the spirit or scope of the invention, and I would have it especially understood that by the term "retarding device" I intend to include any device or form of mechanism which may be employed to interpose a resistance to the recoil of the band or other impact device which is not present and in action when the same is deflected by the impact of the shuttle.

What I do claim, therefore, is—

1. In a shuttle check, the combination of a buffer consisting of a yielding impact band; a fixed support for said band; and a support therefor adapted to move with the band under the impact of the shuttle; and means to prevent the return movement of the support; substantially as shown and described.

2. In a shuttle check, the combination of a buffer consisting of a yielding impact band; a fixed support therefor; a rotating support therefor; and means for preventing reverse rotation of said support; substantially as shown and described.

3. In a shuttle check, a buffer consisting of an impact band with a spring attached to said band, and exerting a tensile strain upon it; a fixed support for said band; a rotating support for said band and means for preventing reverse rotation of said support; substantially as shown and described.

4. In a shuttle check, the combination of a yielding buffer consisting of an impact band, and a spiral spring connecting the ends of said band, with two supports for said band, one of said supports being rotatable in one direction and provided with a ratchet and a dog to prevent reverse rotation thereof; substantially as shown and described.

5. In a shuttle check, the combination of a yielding buffer; a restoring device for returning the buffer to its normal position, and a retarding device for retarding the action of the restoring device; substantially as shown and described.

6. In a shuttle check, the combination of a yielding buffer; a movable support for said buffer; a restoring device for returning the buffer to its normal position, and a retarding device for retarding the action of the restoring device; substantially as shown and described.

HENRY R. MATHEWS.

Witnesses:
H. J. BAILEY,
F. W. GNICHTEL.